US008526823B2

(12) United States Patent
Swanson et al.

(10) Patent No.: US 8,526,823 B2
(45) Date of Patent: Sep. 3, 2013

(54) RECONFIGURABLE DSP PERFORMANCE IN OPTICAL TRANSCEIVERS

(75) Inventors: Eric Swanson, Carlisle, MA (US); Graeme John Pendock, Carlisle, MA (US); Bhupendra Shah, Boxborough, MA (US); Lawrence S. Pellach, Malden, MA (US)

(73) Assignee: Acacia Communications, Inc., Maynard, MA (US)

( * ) Notice: Subject to any disclaimer, the term of this patent is extended or adjusted under 35 U.S.C. 154(b) by 347 days.

(21) Appl. No.: 12/892,327

(22) Filed: Sep. 28, 2010

(65) Prior Publication Data

US 2012/0076502 A1  Mar. 29, 2012

(51) Int. Cl.
*H04B 10/00* (2013.01)

(52) U.S. Cl.
USPC .......................................... 398/136; 398/208

(58) Field of Classification Search
USPC .................................. 398/136, 208
See application file for complete search history.

(56) References Cited

U.S. PATENT DOCUMENTS

| | | | |
|---|---|---|---|
| 5,623,355 A * | 4/1997 | Olsen | 398/162 |
| 6,341,023 B1 | 1/2002 | Puc | |
| 6,473,214 B1 | 10/2002 | Roberts et al. | |
| 6,704,375 B1 | 3/2004 | Serbe | |
| 7,019,882 B1 | 3/2006 | Wilson | |
| 7,069,284 B2 | 6/2006 | Peting | |
| 7,181,146 B1 * | 2/2007 | Yorks | 398/195 |
| 7,292,653 B2 | 11/2007 | Wu et al. | |
| 7,315,575 B2 | 1/2008 | Sun et al. | |
| 7,315,584 B1 | 1/2008 | Epworth et al. | |
| 7,373,087 B2 | 5/2008 | Shi et al. | |
| 7,380,993 B2 | 6/2008 | Dallesasse | |
| 7,397,979 B2 | 7/2008 | Shpantzer et al. | |
| 7,457,538 B2 | 11/2008 | Strawczynski et al. | |
| 7,486,895 B2 | 2/2009 | Werner et al. | |
| 7,522,841 B2 | 4/2009 | Bontu et al. | |
| 7,532,822 B2 | 5/2009 | Sun et al. | |
| 7,536,108 B2 | 5/2009 | Hirano et al. | |
| 7,580,454 B2 | 8/2009 | Carrer et al. | |
| 7,609,979 B2 | 10/2009 | Taylor | |
| 7,616,318 B2 | 11/2009 | Kikuchi | |
| 7,623,797 B2 | 11/2009 | Crivelli et al. | |
| 7,636,525 B1 | 12/2009 | Bontu et al. | |
| 7,688,918 B2 | 3/2010 | Koc | |

(Continued)

OTHER PUBLICATIONS

Optical Internetworking Forum, Multisource Agreement for 100G Long-Haul DWDM Transmission Module—Electromechanical, Jun. 8, 2010, pp. 1-43.

*Primary Examiner* — Nathan Curs
(74) *Attorney, Agent, or Firm* — K&L Gates LLP

(57) ABSTRACT

A method for setting transceiver transmission parameters, in a transceiver having a plurality of components, to achieve the predetermined acceptable end-to-end bit error rate while reducing power consumption. In another aspect the invention relates to an optical transceiver system that uses digital signal processing to process the data stream sent through a fiber optical channel to compensate for transmission, reception and channel impairments to achieve the a predetermined end-to-end bit error rate and to alter its power dissipation to that sufficient to meet said end-to-end bit error rate. In one embodiment the optical transceiver system includes an optical transmitter; an optical receiver comprising an ASIC, FPGA, or other circuitry; and a controller in electrical communication with the optical receiver, wherein the controller controls power to portions of the ASIC so as to reduce power dissipation while meeting the end-to-end bit error rate.

4 Claims, 9 Drawing Sheets

(56) References Cited

U.S. PATENT DOCUMENTS

| | | | |
|---|---|---|---|
| 7,701,842 B2 | 4/2010 | Roberts et al. | |
| 2008/0232808 A1* | 9/2008 | Watanabe | 398/92 |
| 2011/0026941 A1* | 2/2011 | Kunimatsu et al. | 398/208 |
| 2011/0268459 A1* | 11/2011 | Rollins et al. | 398/208 |
| 2011/0293285 A1* | 12/2011 | Aronson et al. | 398/135 |

\* cited by examiner

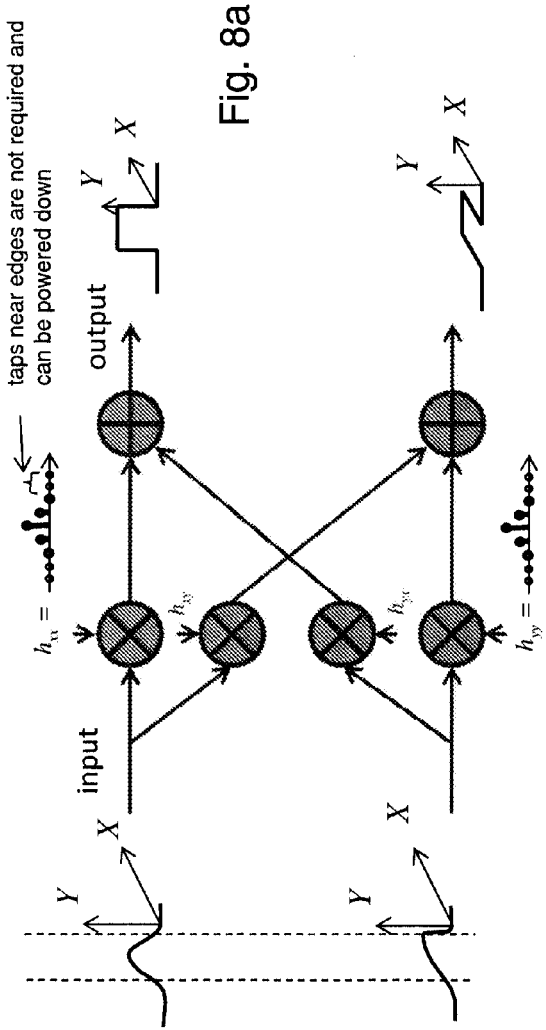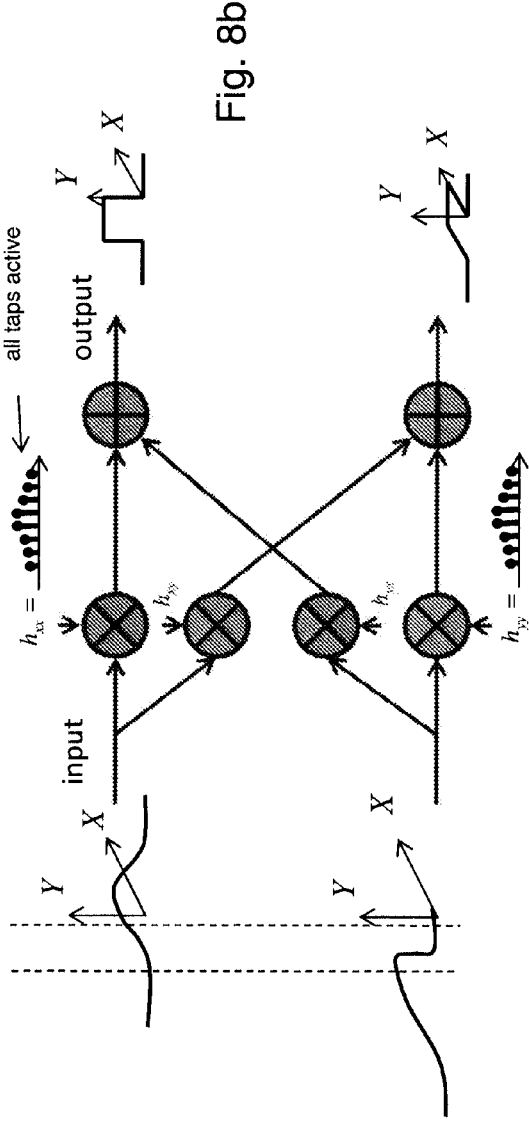

RECONFIGURABLE DSP PERFORMANCE IN OPTICAL TRANSCEIVERS

FIELD OF INVENTION

This invention relates generally to the field of optical transceivers used in optical transmission systems, and more particularly to fiber optic transmission systems that use digital signal process (DSP) techniques to improve the sensitivity, transmission distance, and transmission capacity and compensate for channel impairments.

BACKGROUND OF THE INVENTION

There will be an emergence of digital signal processing (DSP) based optical transceivers for use in optical transmission systems. Such DSP based transceivers offer great advantages over traditional approaches; this includes: lower costs; smaller size; and increased sensitivity, increased transmission distance, increased transmission capacity, and simpler design, installation, turn-up, and maintenance.

DSP based transceivers can be direct detection or coherent detection based. Direct detection systems come in a variety of modulation formats and include On/Off Keying, Differential Phase Shift Keying and these transceiver systems can use DSP based Maximum Likely Hood Sequence Estimators (MSLE) or other techniques to improve performance. Coherent systems include a variety of modulation formats such as Dual-Polarization Quadrature Phase Shift Keying (DP-QPSK), Quadrature Amplitude Modulation (QAM), and Optical Frequency Division Multiplexing (OFDM). Such coherent DSP based systems can operate over a wide variety of system deployment scenarios including the local area network (LAN), metro, regional, long-haul, and ultra-long-haul applications.

To design an optical transceiver module often requires the development of a complex and costly ASIC or FPGA. ASICs can cost upwards of $1M to develop and can take years of development time. The requirements of the optical transceiver module in general and ASIC in particular are very dependent on the deployment scenario. For example, the chromatic dispersion requirements that the transceiver must operate under in the LAN environment are very different than those found in the ultra-long haul environment. The requirements for these two systems can differ by factors of over 1000. The polarization mode dispersion requirement for a long-haul system running over a legacy fiber that was constructed long ago is very different to the requirements for a long-haul system that is running over a newly manufactured and installed fiber. Finally, the power dissipation desired for the LAN environment (which should be low power) can be very different than that desired or acceptable for the long-haul environment (which can be higher than the LAN).

The fact that ASICs are complex and costly to design, and that the requirements for the ASIC can vary depending on the application, leads to conflicts and design tradeoffs. One choice is to either design one ASIC that has the ability to work over all deployment scenarios but may have a very high complexity, gate count and, most importantly, high power dissipation; or design several ASICs, each of which is tuned to the deployment scenario (e.g. one for the LAN, another for the metro, another for the regional, etc). The latter approach has the advantage of being customized for the deployment scenario but has the disadvantage of requiring much higher development costs plus the disadvantage that the end customer (e.g. a telecommunications carrier) must purchase, install, inventory, and spare a different product for many different deployment scenarios. A single ASIC that supports multiple deployment scenarios and uses a single software base, will lead to easier support, quicker time to market, and reduce the risk of software bugs and failures in the field. Even for optical transceiver designs that do not employ an ASIC but use alternative technology such as an FPGA or other digital logic there is a need to design the digital logic with much of the same goals as would be used to design an ASIC. This includes enabling the digital logic to work over a wide range of application scenarios and minimize the power dissipation FIG. 1 shows a conceptual diagram of a fiber optical transmission system known to the prior art with a dense wavelength division multiplex (DWDM) transponder. The example shows a router in Boston connected via a short-reach transponder to a line card on a transport system that transmits via a DWDM transponder on the same line card over a long-haul amplified system to a similar distant terminal in New York. As is known in the art there are several variations of this including one in which the DWDM transponder is on the router line card (instead of the transport system), where the optical fiber link has longer distances (e.g. ultra-long haul) or has no amplifier hubs (e.g. LAN) or is used in a submarine application. Furthermore there are many known variants of the DWDM transponder. For example the DWDM transponder may be in a self contained module, may include Forward Error Correction Coding and framing inside the module or external to it (as shown), or there may not be a self contained module at all in which case the components are distributed throughout one or more line cards. For simplicity going forward this discussion will refer to a transceiver module without loss of generality.

As mentioned earlier, it is highly desirable to have one design that can work over local area network (LAN), metro, regional, long-haul, and ultra-long-haul installations. In the prior art either multiple designs were implemented to optimize the power dissipation and other characteristics within the transponder module or a high complexity and high power consumption design was implemented that could work in all these installation scenarios. The resulting design typically was far from optimal in performance parameters such as power dissipation and other characteristics. Further, configuring a prior art transponder requires manually measuring the link characteristics and tuning the transponder to match the link conditions.

Thus there is a need for an approach that allows a single module design to be configured in-situ such that it can be optimized in its power dissipation and other characteristics for a variety of end customer applications that can vary over several orders of magnitude. Such an approach has many benefits to the end customers (e.g. system vendors and telecommunication operators) including lowering capital costs and operational costs by minimizing the products they need to plan for, buy, support, and maintain. The present invention addresses this need.

SUMMARY OF THE INVENTION

This invention relates to methods, designs, and techniques used in an optical transceiver in optical transmission systems, including fiber optic transmission systems. In another embodiment, the power consumption and other characteristics of the transceiver module in general are designed such that the digital signal processing, in particular, can be tailored, both automatically and dynamically, (in situ) to a particular optical link.

In one aspect the invention relates to methods for matching transceiver transmission parameters, in a transceiver having a plurality of components, to achieve the predetermined end-to-end bit error rate while reducing power consumption. In one embodiment the method includes the steps of measuring at least one channel parameter necessary to meet the predetermined end-to-end bit error rate; determining which of the plurality of components contribute to the measured channel parameter; and altering the clock, the component parameters and/or the power supplied to components of the transceiver not required to meet the end-to-end bit error rate requirements.

In another embodiment the method further includes altering the clock, component parameters and/or the power to those components which contribute to the measured channel parameter so as to cause the channel parameter to reach a value necessary to meet the predetermined end-to-end bit error rate. In another embodiment the method further includes repeating the steps for each parameter contributing to the predetermined end-to-end bit error rate. In yet another embodiment of the method the parameters comprise bulk chromatic dispersion, polarization mode dispersion, and non-linear compensation.

In another aspect the invention relates to an optical transceiver system that uses digital signal processing to process the data stream sent through a fiber optical channel to modify transmission capabilities to achieve the a predetermined end-to-end bit error rate and to alter its power dissipation to that sufficient to meet said end-to-end bit error rate. In one embodiment the optical transceiver system comprise an optical transmitter; an optical receiver comprising an ASIC; and a controller in electrical communication with the optical receiver, wherein the controller controls clock, component parameters and/or power to portions of the ASIC so as to reduce power dissipation while meeting the end-to-end bit error rate. In another embodiment the clock, component parameters and/or power supplied to the portions of the ASIC is varied in response to either a one-time measurement of at least one channel parameter or a continuous field measurement of at least one channel parameter so as to minimize the total power dissipation while meeting the predetermined end-to-end bit error rate.

In yet another embodiment portions of the ASIC contain a set of distinct sub-modules for compensating different optical channel impairments. In still yet another embodiment each of the sub-modules are constructed from a plurality of substantially similar blocks that may be powered down individually when not needed to support the said end-to-end bit error rate. In another embodiment a portion of the ASIC is an adaptive equalizer module and the adaptive equalizer module can simultaneously perform both polarization mode dispersion equalization and chromatic dispersion compensation and wherein the chromatic dispersion compensation function may be reduced so as to save power. In another embodiment the adaptive equalizer module includes sub-modules; the sub-modules are continuously monitored for their level of use, and the state of the sub-modules are dynamically changed so as to minimize power consumption.

In another embodiment power consumption is automatically modified in response to an in-line pseudo-random bit pattern generation, or other continuous or one-time training sequence, during data transmission and subsequent checking on the received data so as to minimize the total power dissipation necessary for the predetermined end-to-end bit error rate. In another embodiment, a PRBS or other training or tracking sequence, code words, or parity check is continuously injected in to part of the output data stream to continuously monitor the received data quality for acceptability while minimizing the power dissipation. In yet another embodiment the ASIC includes an analog to digital converter and the power utilization may be reduced by reducing the sampling rate of the analog to digital converter. In still yet another embodiment the ASIC includes an analog to digital converter and the power utilization can be reduced by reducing the sampling precision of the analog to digital converter.

BRIEF DESCRIPTION OF DRAWINGS

The invention is pointed out with particularity in the appended claims. The advantages of the invention described above, together with further advantages, may be better understood by referring to the following description taken in conjunction with the accompanying drawings. In the drawings, like reference characters generally refer to the same parts throughout the different views. The drawings are not necessarily to scale, emphasis instead generally being placed upon illustrating the principles of the invention.

FIGS. 8 *a* and *b* are signal diagrams of embodiments of equalization with minimal pulse spreading (a) and equalization with large pulse spreading (b)

DETAILED DESCRIPTION OF THE INVENTION

Figure 1:
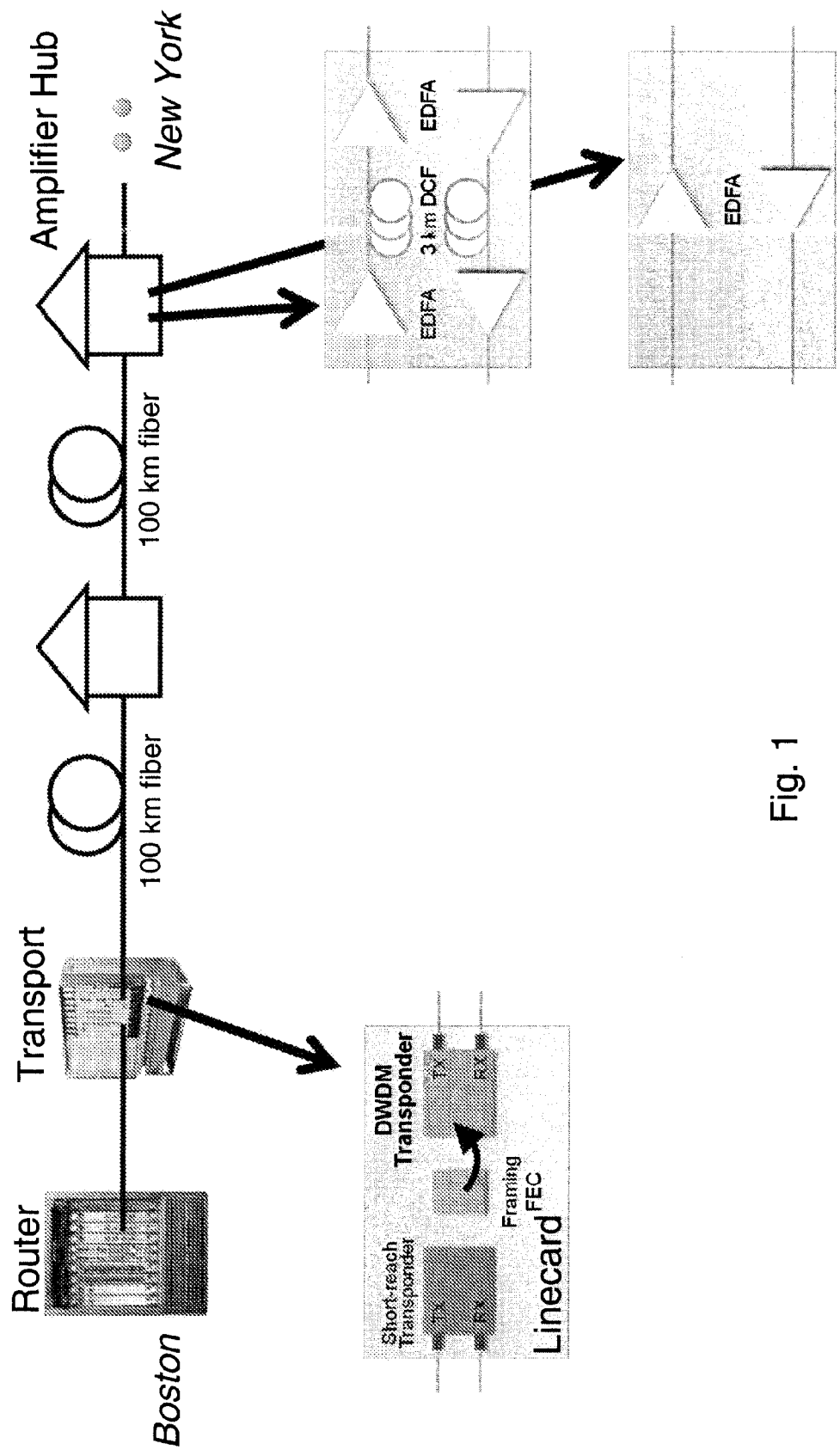
FIG. 1 is a conceptual diagram of a fiber optical transmission system with a dense wavelength division multiplex (DWDM) transponder known to the prior art.

In brief overview and referring again to FIG. 1, it can be envisioned that there are many installation scenarios of interest to system vendors and their end customers who are telecommunication companies, cable operators, and data centers, government organizations, etc. There are several metrics that help define the installation scenario with respect to the needs of the optical transceiver system. This includes: 1) the transmission distance which is often loosely described as LAN, metro, regional, long-haul, and ultra-long-haul applications; 2) the fiber type standard SMF (single mode fiber), zero-dispersion fiber, dispersion shifted fiber, and other types of fiber; 3) the dates on which the fiber was manufactured and how it was installed; and 4) the characteristics of how the optically amplified link is designed (e.g. with amplifier huts and with or without dispersion compensation at each amplifier hut). It is these and other widely varying characteristics—total transmission distance, fiber type, fiber age, and link design—that give rise to the need to have a transmission module that is adaptable.

As one example, assume a 100 Gb/s DP-QPSK 1000 km long link operating over newly installed SMF fiber that does not have integrated dispersion compensation at the amplifier huts. The expected total chromatic dispersion requirement for the ASIC would be D=1000 km*17 ps/nm.km=17,000 ps/nm. The expected polarization mode dispersion (PMD) requirement for the ASIC would be ~2 ps DGD (differential group delay). Due to the long nature of the link the optical signal to noise ratio (OSNR) at the receiver could be very low, with about a 16 dB OSNR.

Now assume that the same link but that the installation is a legacy installation that has been operating with 10 Gb/s or 40 Gb/s channels and has inline dispersion compensation fiber at the amplifier huts. In this case the expected dispersion requirement for the ASIC is far less (~1000 ps/nm). But due to the legacy nature of the fiber, the PDM of the installed fiber could be very poor and the PMD requirement for the ASIC could be ~30 ps DGD. Such a link would have a similar OSNR of about 16 dB.

Finally, assume a 100 Gb/s DP-QPSK link operating in the metro environment. A typical metro distance is ~100 km. Thus the dispersion requirement for the ASIC could be 1,700 ps/nm. The PMD could vary widely depending on the type and installation of the fiber. Due to the shorter distance and potentially many fewer amplifier nodes, the received OSNR might be significantly higher at about 20 dB.

For this example, for use in a 100 Gb/s link, a single transceiver module would have to have the following specifications: Dispersion Range 0 to 50,000 ps/nm; PMD Range 0 to 30 ps DGD; OSNR Range: 12 dB to 30 dB.

Figure 2:
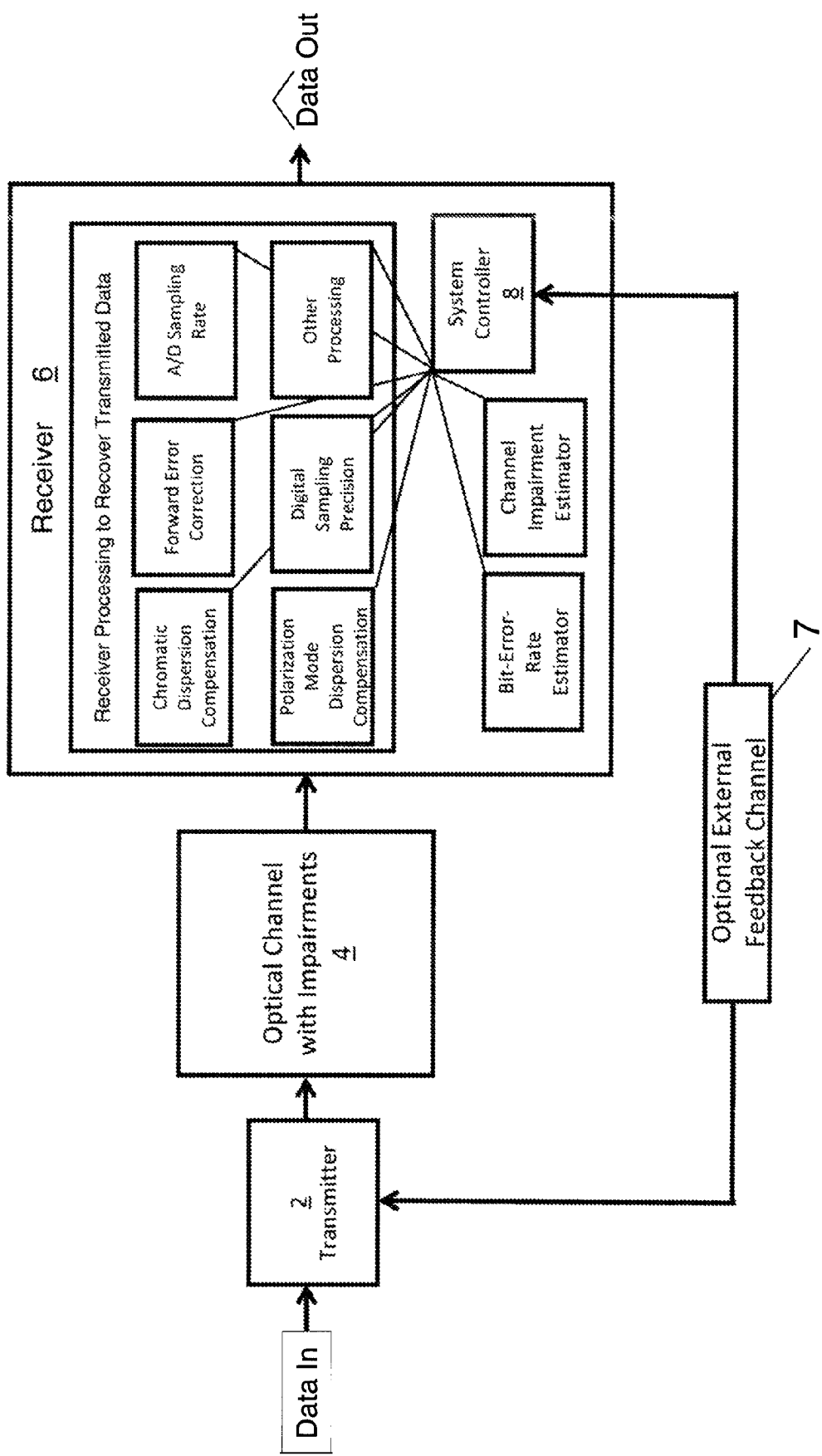
FIG. 2 is a block diagram of a system constructed in accordance with the invention.

In brief overview and referring to FIG. 2, to achieve this flexibility while constraining power consumption, the transceiver must transmit data while measuring channel parameters. The modules of the transceiver which compensate for the channel parameters are then tuned to compensate for the channel parameters sufficiently to result in a desired end-to-end bit error rate.

Data is input and is encoded onto an optical carrier in the Transmitter Block 2. The transmitted optical light is sent over an Optical Channel 4 having impairments that degrade the signal quality. The impairments may include those commonly encountered in fiber optic channels such as chromatic dispersion, polarization mode dispersion, polarization dependent loss, noise, and non-linear optical effects.

The receiver 6 receives the corrupted modulated optical light and processes the received light to extract a good estimate of the data input present at the transmitter and then outputs this data (Data Out). As described later in this application, sophisticated signal processing is used to combat the effects of the channel impairments. This processing in various embodiments includes Chromatic Dispersion Compensation, Forward Error Correction Decoding, Polarization Mode Dispersion Compensation, Adjusting the Digital Sampling Precision, Adjusting the A/D Sampling Rate, among others. All of these blocks operate in concert under command of a system controller 8 that is used to adjust and control various aspects of the processing. For example the system controller 8 can turn off the Chromatic Dispersion Compensator and bypass it completely or the system controller can adjust the Sampling Rate of the A/D converter from 8 bits to 4 bits (as well as adjust the subsequent processing precision) so as to conserve power.

The receiver 6 also has the ability to estimate the Bit-Error-Rate (BER) of the channel and/or has the ability to estimate the channel impairments. For example BER can be estimated by injecting a pseudo-random binary sequence (PRBS) in a small time-sliced portion of the transmitter stream and recovering that section of the transmitter stream at the receiver or can use bit parity checks or other techniques as is known in the art. Alternatively as known in the art of Forward Error Correction (FEC) coding, various algorithms can be use to encode the transmitted stream and decode the received stream to recover the transmitted data with increased sensitivity. Many such algorithms, in addition to correcting for bit errors, can easily output an estimate of the channel (uncorrected) bit error rate as well as estimate the final corrected end-to-end bit error rate.

In correcting for the channel impairments the receiver 6 also implicitly has estimates of the values of some of the impairments. In one embodiment these estimates may be continuously updated in real time. In another embodiment the receiver includes the ability during initial setup of the channel to send specific training or pilot sequences via the feedback channel 7 from the receiver to the transmitter to further isolate channel impairment estimates.

Unfortunately each of the receiver processing steps consumes electrical power. One aspect of this invention is to minimize dissipated power in the receiver by only using as much electrical processing as need to ensure the desired end-to-end bit-error-rate is met or exceeded. One way to do this involves using the channel impairment estimator to control the fidelity or the by-passing of a given electrical processing step. For example if the receiver 6 estimates the chromatic dispersion in the link is very low then the entire chromatic dispersion processing block can be bypassed and shut down, dramatically lowering the power consumption at the receiver. If the receiver estimates that the optical signal to noise ratio (OSNR) is very high then the number of FEC decoding steps can be reduced.

Another method to accomplish power reduction is to monitor the bit-error-rate estimator and adjust the receiver processing blocks down in power while monitoring the BER until the desired end-to-end bit-error-rate is achieved (with acceptable margin). One preferred approach is to monitor the BER and start with adjusting the maximum power processing steps (e.g. Bulk Chromatic Dispersion) and first determine if the Bulk Chromatic Dispersion can be bypassed and the receiver BER achieved. If the Bulk Chromatic Dispersion correcting step can be bypassed, then the next step would be to go to the FEC Decoder and again determine if the coding gain can be reduced. This can be done for each compensation step such as the PMD compensator and determine which, if any, of the taps can shut off as described below. These steps can be done manually with human intervention (by connecting a computer to the system controller) or they can be done in an automated way either once at startup or continuously during operation of the transceiver.

The result of all this is that if the entire FEC is bypassed a total savings of several watts is achieved. Similarly power saving is achieved if the Bulk CDC or PMD modules are bypassed. These power savings can represent a large fraction of the total transceiver power and thus this shows the value in reducing the number of modules in use to those that are necessary to meet the BER and not more.

Figure 3:
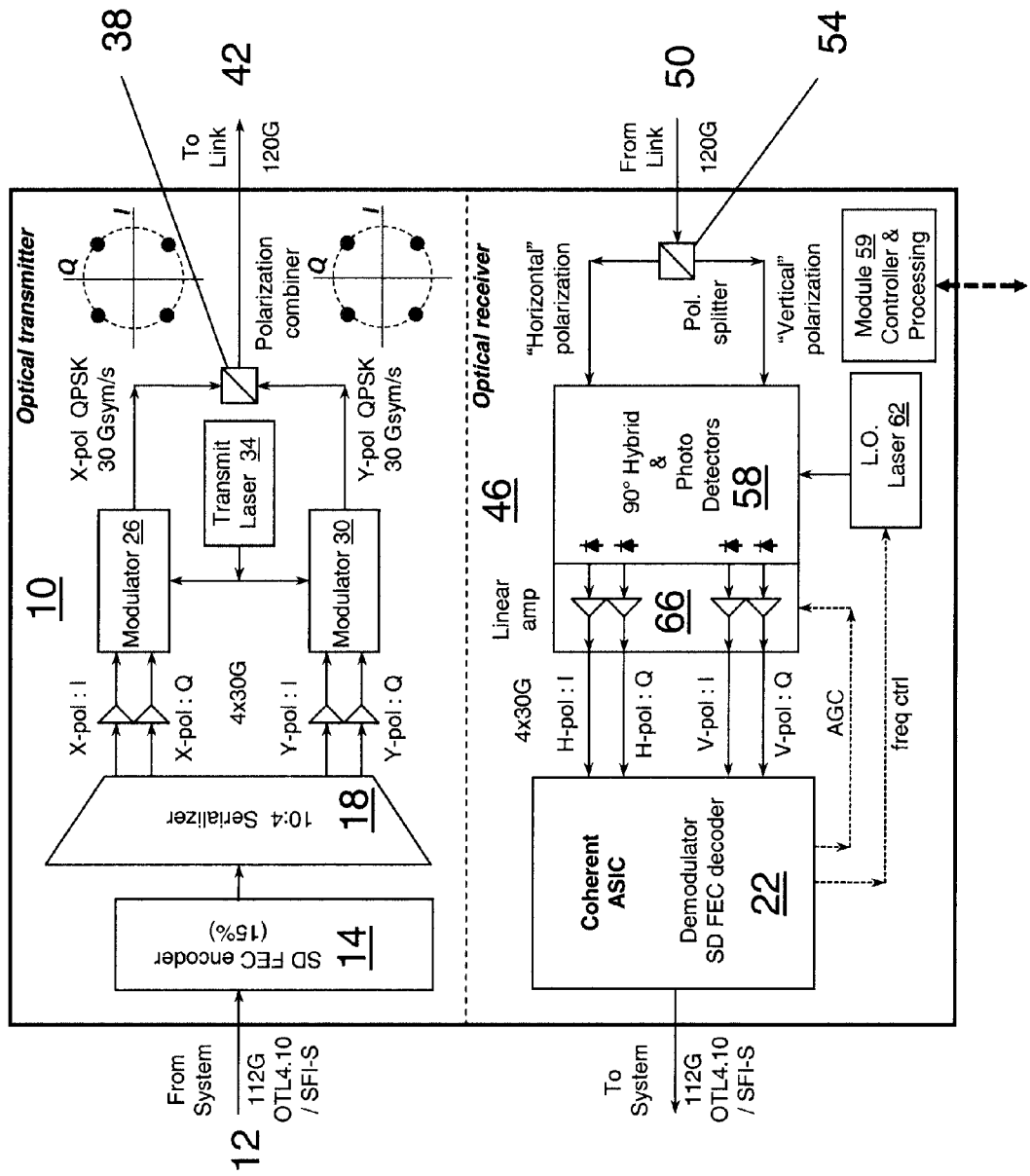
FIG. 3 is a diagram of an embodiment of a DP-QPSK coherent DWDM transceiver module known to the prior art.
Figure 4:
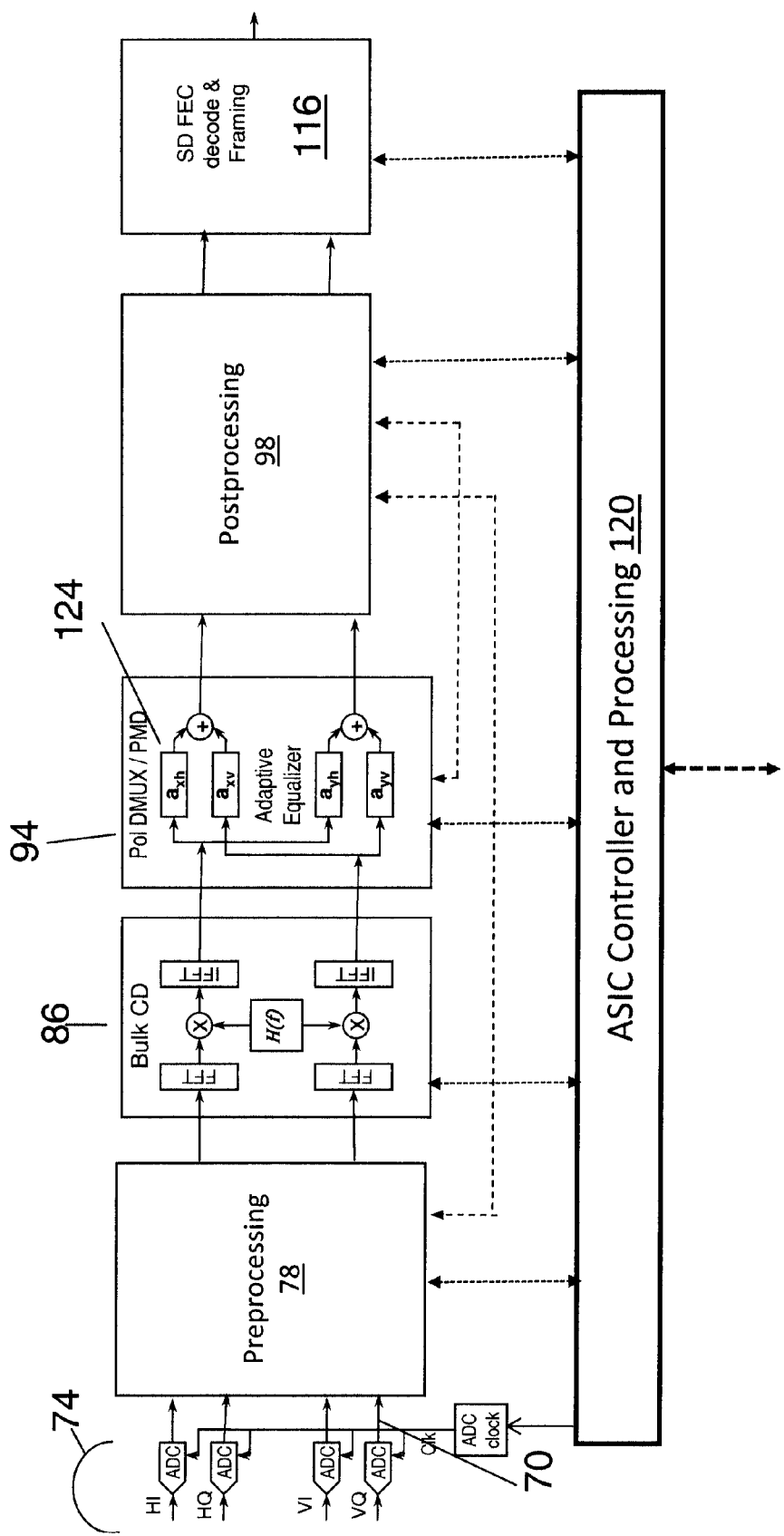
FIG. 4 is a diagram of an embodiment of a DSP architecture that is used within the ASIC in accordance with the invention.

In more detail and referring to FIGS. 3 and 4 there are many ways to design a dispersion compensation architecture and implementation, a Polarization Demultiplexer/Polarization Mode Dispersion (Pol DMUX/PMD) architecture and implementation, and a Soft Decision-Forward Error Correcting (SD-FEC) architecture and implementation. Most of these implementations do not lend themselves to the ability to power down and bypass sections of the ASIC when that functionality is not needed. An aspect of this invention is to utilize architectures that allow for segmentation of progressive stages of signal improvement functionality such that when that functionality is not needed that section of the ASIC can have its power dissipation altered or even powered down completely and bypassed. Although such a transceiver is discussed in terms of specific examples used in a 100 Gb/s QPSK coherent transceiver module, the concepts equally apply to many other types of optical transmission systems as well.

Referring again to FIG. 3, on the transmitter side 10 an electrical signal 12 is received from a system such as a transport, switch or router line card. The electrical signal is encoded by an encoder 14 using soft-decision forward error correction (SD-FEC) coding. Other types of codes can be used or no FEC code at all can be used. Although not shown, the SD-FEC encoder and other parts such as the 10:4 serializer 18 can optionally be performed in ASIC 22. The output of the SD-FEC is serialized into four output streams that are amplified and sent to two separate QPSK electro-optical or other non-electro-optical type modulators 26, 30. A transmitter laser 34 is optically connected to the modulators 26, 30 and the two respective modulated optical output signals are combined using a polarization combiner 38. The combined optical output is sent to the output link 42. Although this has been discussed in terms of a DP-QPSK implementation, other implementations such as a QAM, OFDM or a DP-BPSK can be used.

On the receiver side 46 a DP-QPSK modulated signal is received from the link 50 and sent into a polarization splitter 54 to the split the signal into horizontal and vertical polarizations. The two optical outputs are sent to a 90 degree hybrid and photo detector module 58 as is known in the art. A local oscillator (LO) laser 62 is also coupled to the 90 degree hybrid module 58 and the output of the 90 degree hybrid is sent to four amplifiers 66 and into the ASIC 22. The ASIC 22 performs many functions including: chromatic dispersion correction, polarization mode dispersion correction, descrambling of polarization axes, symbol timing recover, carrier frequency and phase estimation, SD-FEC decoding, and more. The operation of the device 10 is monitored and controlled by the device control unit 59 (connections not shown for clarity). Note that other architectures are used for QAM or OFDM or BPSK as is known to those familiar with the art.

There are five major modules to the ASIC 22. These include the ADC, bulk dispersion compensation, Pol DMUX/PMD (also called an adaptive equalizer), SD-FEC, and serializer/deserializer or serdes modules. There are several smaller sections to the ASIC which are not described in detail here. Note that the majority of the power dissipated within this ASIC is typically from the dispersion compensation, the adaptive equalizer, and the SD-FEC modules. It should also be noted that the design of the bulk dispersion compensation section can be made up of several nearly identical sub-sections. The design of the Pol DMUX/PMD section can be made up of multiple nearly identical sub-sections. Finally in one embodiment the design of the SD-FEC section can be made up of several nearly identical subsections although more or fewer subsections can be used. Using nearly identical subsections minimizes the development risk of the ASIC. Partitioning modules according to functions enables modules, or subsections of modules, to be bypassed when not required, thereby saving power. For example in a LAN application where there is very little chromatic dispersion there is no need to apply and dissipate power in the bulk dispersion compensation block. However not all ASIC architectures or moreover all DSP algorithms lend themselves to this capability.

Referring again to FIG. 4, within the ASIC 22 the four outputs 70 from the 90 degree hybrid shown in FIG. 2 are input to high speed analog-to-digital converters (ADC) (generally 74). The outputs of the ADCs 74 are sent to a pre-processing block 78 to remove imperfections that may have been introduced by some of the optical components in the transmit or receive chain. The pre-processing block 78 performs a variety of functions which may include transmit/receive frequency tracking, interpolation, and other functions. The output of the pre processing block 78 is sent to a bulk chromatic dispersion module 86 that removes the majority of the chromatic dispersion that occurs, for example, in fiber optical transmission.

The output of the chromatic dispersion module 86 is sent to a Polarization Demultiplexer Polarization Mode Dispersion (Pol DMUX/PMD) module 94 (also called an Adaptive Equalizer). This module descrambles the transmitter and receiver polarization alignment, does additional fine tuning to the chromatic dispersion, and compensates for polarization mode dispersion. The output of the Pol DMUX/PMD module 94 is sent into a post processing block 98 which corrects other imperfections in the signal such as carrier frequency error, carrier phase error, symbol timing offset, non-linear compensation and other functions before being sent to a SD FEC decoder 116.

Each of the sub-modules is in communication with an ASIC controller 120. Components outside the ASIC 22 such as the device controller 59 (FIG. 3) communicate with and control the ASIC 22 either through the ASIC controller 120 or through direct data busses (not shown).

The OSNR requirements for an optical transceiver module can vary widely depending on the actually deployed installation. At high data rates such as 100 Gb/s forward error correction (FEC) is a critical component to extend the distance a signal can travel. For example SD-FEC algorithms can improve the sensitivity of a link by over 10 dB enabling a ten times longer transmission distance than in systems without FEC. However the implementation of advanced high-speed FEC algorithms comes with the penalty of increased power dissipation in the ASIC—a penalty that is not needed for shorter distances such as in LAN or metro applications. While it is desirable to be able to turn the FEC on or off; it is even more desirable to be able to achieve FEC gains in between pure on or pure off.

In more detail, and considering the modules shown in FIG. 4 individually, the FEC decoder is an important function of the ASIC 22. There are a wide variety of hard decision and soft decision FEC codes that may be used in the transceiver. For SD-FEC this includes low-density bit parity check (LDPC) and turbo product codes (TPC). Some of these codes such as the TPC can be implemented using a series of nearly identically stages that have progressively increasing coding gain. The inherent partitioning of these codes is ideal for optical transceiver applications since any number of these stages can be turned on/off to simultaneously optimize the inherent OSNR and dissipated power.

Similar to the varying requirements imposed on the FEC module, the PMD requirements for an optical transceiver module also can vary widely depending on the transmission distance and type and date of the fiber installation. Implementing PMD compensation in the ASIC is critical to achieving robust performance in a wide variety of scenarios. There are a wide variety of algorithms to implement PMD compensation. Of particular importance here are PMD algorithms that lend themselves to a partitioning such that varying sections can be powered down when the full performance of the PMD capability is not needed.

The adaptive equalizer 94 shown in FIG. 4 is used to undo or "equalize" out signal distortions in the transmission fiber from polarization mode dispersion and limited chromatic dispersion. The scale of the operation performed in this module can be dynamically changed to perform only what is needed, thus minimizing power consumption. In its simplest form, the adaptive equalizer 94 consists of four multipliers generally 124 (FIG. 4) that map weighted and potentially time delayed combinations of the two polarization inputs to the two polarization outputs. This enables the adaptive equalizer 94 to orientate the random polarization input to the correct axes for the receiver.

Figure 5:
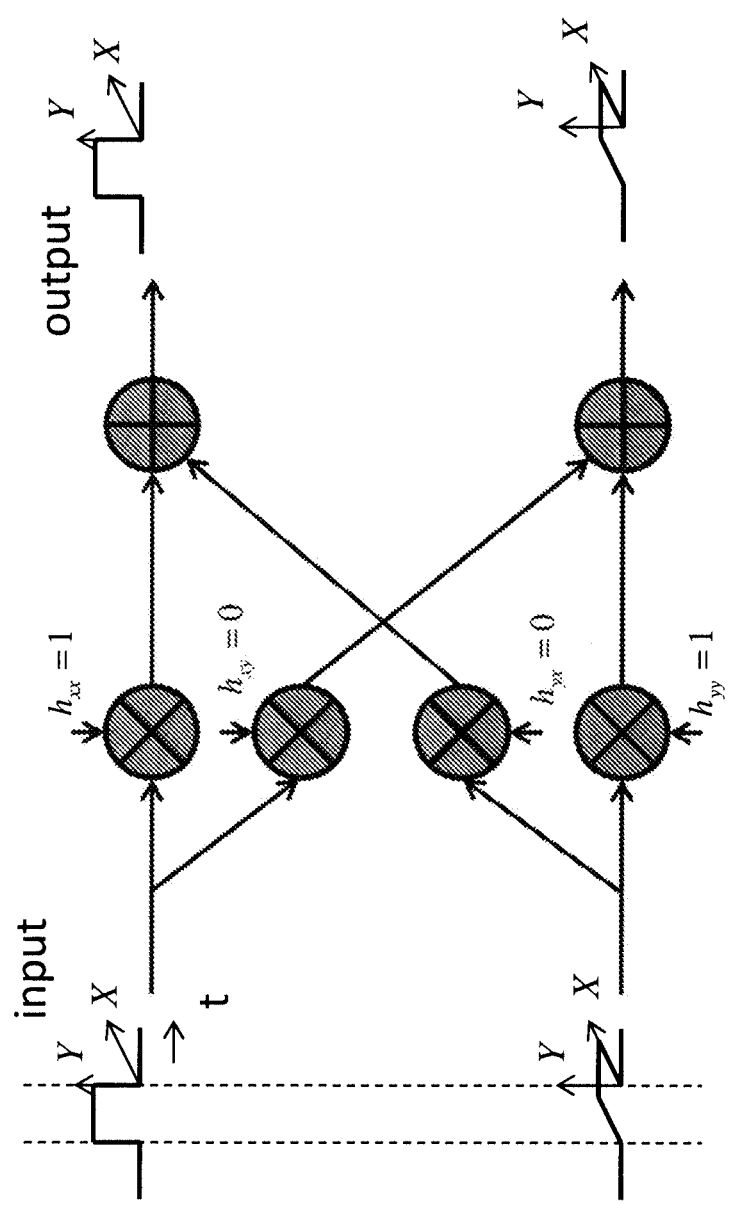
FIG. 5 is a signal diagram of an embodiment of the adaptive equalizer settings when the polarization states of the input signal are correctly oriented.
Figure 6:
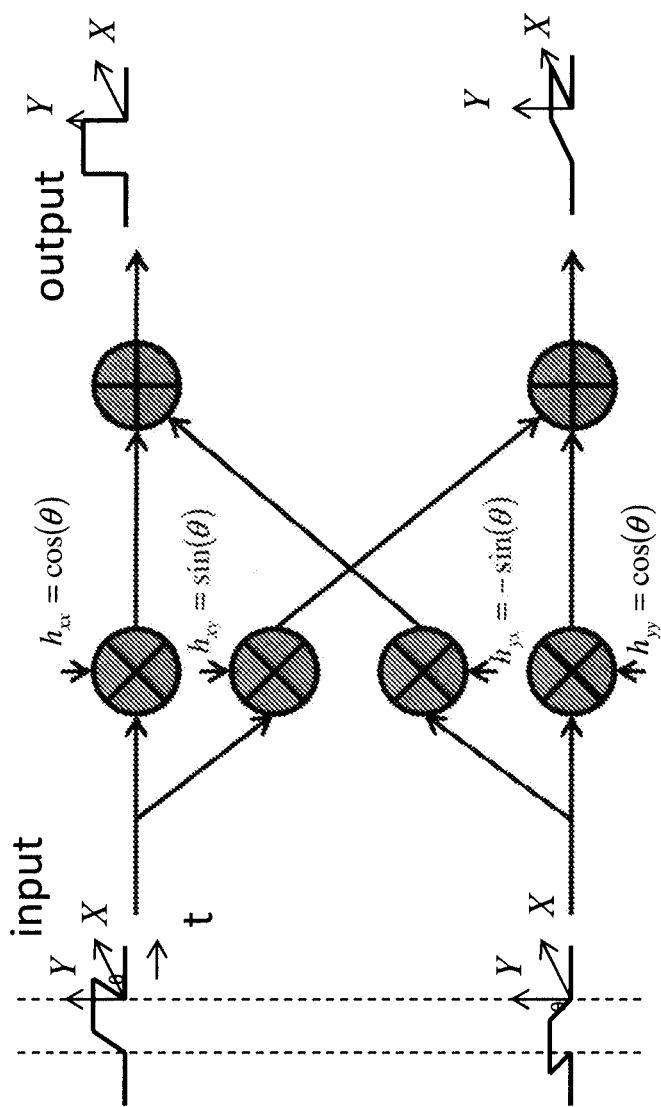
FIG. 6 is a signal diagram of an embodiment of the adaptive equalizer settings when the polarization states of the input signal are not correctly oriented and are rotated off axis by an angle θ.

FIGS. 5 and 6 illustrate the basic operation of the equalizer. Data is transmitted in two spatially orthogonal polarization states, namely X and Y (see FIG. 3. X-pol and Y-pol respectively). For correct reception these polarization states must be correctly orientated at the receiver. Generally these are not, since the polarization typically twists and delays randomly with transmission. Correctly aligning these vectors is one of the roles of the equalizer 94. Considering first FIG. 5, there are a total of four paths with filters that map the two polarization inputs to the two polarization outputs. For the time being consider these filters as single multipliers. In the ideal, but unlikely, case when the input polarizations are correctly aligned (shown in FIG. 5) the through filters (hxx and hyy) allow the two inputs to pass unaltered, and no cross coupling is needed (hxy and hyx are set to zero). However, in the general case when the received polarizations are not correctly aligned, shown in FIG. 6 where the polarizations are misaligned by an angle θ, then the cross-couplings can be increased, and the through couplings decreased, which spatially rotates the received inputs to the desired output polarization alignment.

The second role of the equalizer is to undo both temporal shifts between the polarization states and smearing of the received pulses. To achieve this requires instead of a single multiplier, a filter with a "FIR" structure in which there are a finite series of delays that buffer the latest set of incoming samples, FIG. 7. Using these multiple tap values enables "temporal smearing" of transmitted pulses, due to effects such as polarization mode and chromatic dispersion, to be undone. Corresponding sets of multipliers allow these different samples to be picked off, and then combined. The number of taps that need to be used is dependent on the amount of temporal smearing.

Figure 7:
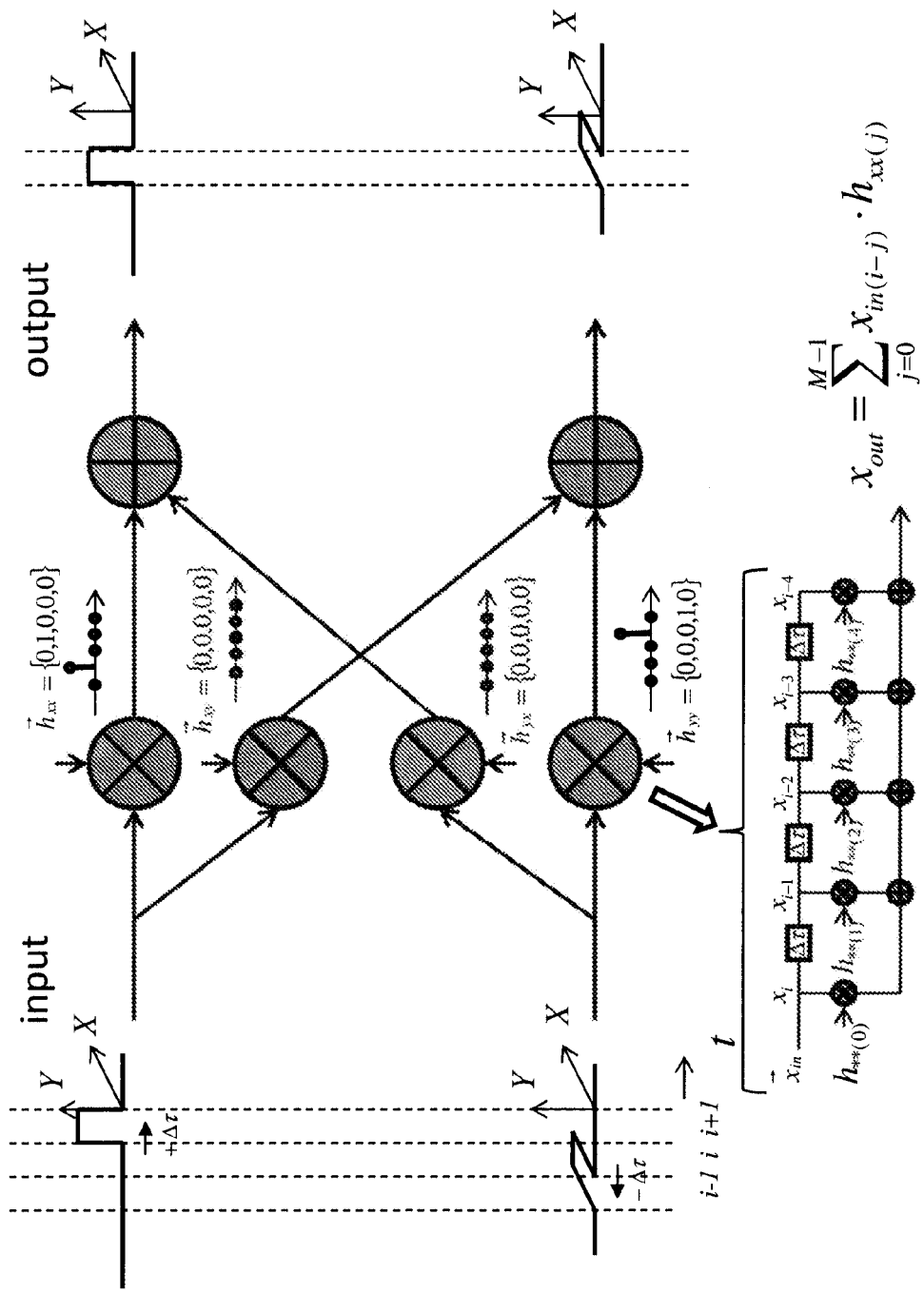
FIG. 7 is a signal diagram of an embodiment for an FIR filter that allows the equalizer to correct for time shifts between polarizations.

FIG. 7 illustrates how the tap structure compensates for offset in the delays between received X and Y pulses. In the figure the X(Y) pulse arrives Δt later (earlier) than the nominal time slot. If Δt corresponds to the sample delay, then the pulses can be realigned at the output by setting the FIR multipliers so that the X(Y) signal is tapped off Δt earlier (later) than a nominal center. In this example, the simple time shift required here is achieved using just one active multiplier from the range of tap values. By dynamically monitoring and controlling the number of tap multipliers that are kept active, the device can provide adequate compensation but keep power consumption to a minimum.

In general, the pulses become temporarily distorted and multiple taps and multipliers are needed to "reshape" it to its expected state. Pulses are smeared out in transmission due to polarization mode dispersion and chromatic dispersion. Both these impairments vary widely between different links depending on fiber type, fiber quality and any other existing compensation. Furthermore the magnitude of these impairments may change over time. For example ambient perturbation causes the polarization and dispersion to change. This reshaping is termed "equalization"—or undoing of the transmission impairments.

As is known in the art, algorithms exist, such as the decision directed least mean squares, decision directed recursive least square, or constant modulus algorithm (CMA) that enable the optimum solution of tap weights to be found to reshape the pulse. Generally, the more broadly the pulse is smeared, the greater must be the number of taps provided so the appropriate time range is covered. It is highly desirable to have one product and design that covers different applications and dynamically adapts to changing transmission requirements in a way that minimized energy consumption.

Furthermore the taps are monitored and inactive taps multipliers are disabled thereby ensuring dynamically changing compensation requirements are adequately met whilst simultaneously minimizing power consumption. Disabling a tap multiplier saves energy since it is the digital switching for the calculation that consumes majority of the energy, not its existence. The taps of the FIR filter are controlled such that there is a middle section where the taps are active, with the taps multipliers outside this region being inactive. The size of this active region is dynamically expanded or contracted to accommodate variations in PMD. To achieve this the tap value at the boundaries of the active region are monitored. If any of those tap multipliers fall below a set threshold then their contribution can be considered insignificant and they can be temporarily disabled thereby shrinking the active region (FIG. 8a). Alternatively, if they exceed another (larger) threshold then the adjacent inactive tap multipliers is re-enabled to expand the active region and meet the demand for increased temporal compensation (FIG. 8b).

FIG. 8a shows an example of equalization with minimal pulse spreading/separation due to low chromatic and/or polarization dispersion. Only few taps in center are required to reshape and realign the pulse. Unused tap multipliers are disabled to save power. FIG. 8b shows an example of equalization of large pulse spreading/separation due to higher chromatic and/or polarization dispersion. All taps can be activated to enable maximum equalization.

As with the other parameters the chromatic dispersion compensation requirements for an optical transceiver module can vary widely depending on the actually deployed installation. As discussed, the dispersion requirement can vary from almost 0 to as large as 50,000 ps/nm or higher. There are many algorithms that can be used to compensate for chromatic dispersion. These include frequency domain and time domain implementations. In time domain implementations there are a series of taps making up a delay line and a multiplier/adder block that is used to undo the effects of chromatic dispersion. The disadvantage of time-domain implementations is that, for some scenarios they require many stages and have very high power dissipation.

In either frequency or time domain implementations a large window of signal is stored in a register and then Fourier transformed. This transformed signal then multiplied by a complex weight and then inverse Fourier transformed back into the time domain. This has the advantage of being much lower in power dissipation for some situations. For either the frequency or time domain implementations, the Chromatic Dispersion module can be designed to compensate for example, up to +/−50,000 ps/nm or more of dispersion. Furthermore one embodiment of the system has a Pol DMUX/PMD module that is primarily intended to compensate for PMD but this module can also correct for some Chromatic Dispersion.

Figure 9A:
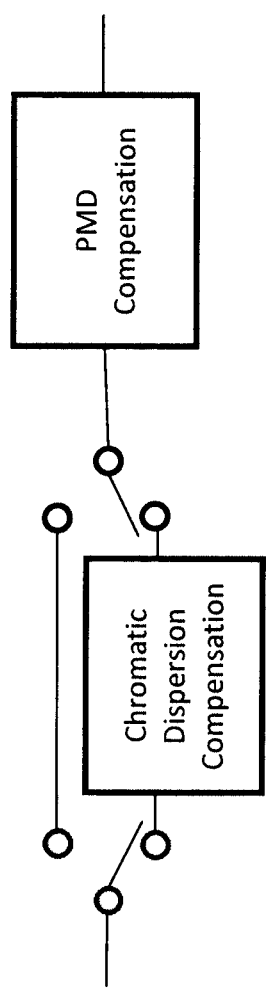
FIG. 9 is a block diagram of an embodiment depicting a bulk chromatic dispersion compensation block active (a) and bypassed (b).

In the case of an installation into a system consisting of a long fiber link of a fiber type that has noticeable PMD and no inline dispersion compensation, then both the PMD and the Chromatic Dispersion modules are active (FIG. 9a). The dispersion module compensates for the full chromatic dispersion of the link, and the PMD module compensates for the PMD alone.

However, the PMD module, also has a capability to compensate for moderate amounts of chromatic dispersion. When there is no significant PMD then this capability is at its maximum and may be up to say +/−1000 ps/nm of chromatic dispersion.

Figure 9B:
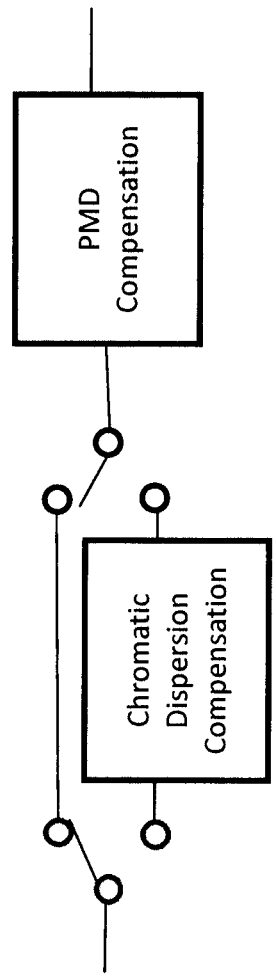

Hence in systems that have short link lengths (e.g. regional/metro) or existing links of good fiber (hence low PMD) that are already dispersion compensated with tradition bulk fiber or other types of dispersion compensating modules, then the Pol DMUX/PMD module (or PMD compensation module in FIG. 9) may be capable of providing all the dispersion compensation itself. In this case, the dispersion compensation block can be bypassed and deactivated, to save power, (FIG. 9b). Note that it may not be necessary to "bypass" this block as is known in the art, but the various states and registers and multipliers can be altered so that the processing is simplified (e.g. multipliers loaded with one input set to "1") to reduce power consumed without the processing module actually being bypassed.

Furthermore bypassing the dispersion module can be done automatically allowing the same receiver to reconfigure itself according to circumstance to minimize power. The amount of dispersion being provided by the PMD module can be extracted from the values of its tap multipliers. If the PMD module is capable of providing the required dispersion compensation then the chromatic dispersion module can be deactivated/bypassed. While a simple example of a 1 stage bypass is shown in FIG. 9, this concept can be extended to a series of functions that can be enabled or bypassed to allow greater flexibility.

There are many other examples of techniques that can be used inside an optical transmission module to trade-off functionality with power dissipation. This includes the following:

Adjustable ADC Sampling Rate: It is widely known that a sampling rate higher than the Nyquist criterion offers the best performance in signal fidelity which translates to OSNR and other factors. However for shorter links that do not need high fidelity, a lower sampling rate can be utilized and this lower sampling rate offers much lower power dissipation in the ADC and DSP functions. Reducing the sampling rate also reduces the frequency of the output data feeding the demodulator. Such a reduction in sampling rate therefore has a linear reduction of power (since $P=CV^2f$, where C is capacitance, V is voltage, and f is the digital clock frequency). Thus for a long haul application with stringent OSNR, dispersion, or PMD requirements it might be that the full Nyquist sampling is implemented, but in a short haul point to point application sub-Nyquist sampling is used to achieve savings in dissipated power.

Adjustable precision: Similar to the ADC sampling rate, on a link where high fidelity is not required, the precision of the multipliers, adders, etc. in the DSP is turned down to save power. For example, if the input to an 8 bit multiplier is truncated down to 6 bits, the lower 2 bits are in a 0 state, saving power through the entire logical path downstream from that multiplier.

Automatic Optimization of Power Dissipation: There are two basic methods to optimize the power dissipation of the optical transceiver module: manual (human intervention) or automatic for the automatic the optimizations can be done one time or continuously. As the name implies the manual adjustment of the power dissipation is achieved during system installation or can be done occasionally thereafter if the installed system is being altered. For example a field technician can configure via a computer the various sections of the module based on known or measured link parameters. In automatic implementation software in the module can be used to optimize the power dissipation at the time of installation (or even continuously) based on measured data from the transceiver itself and/or for other external equipment such as optical channel monitors.

Referring again to FIG. 3, during system installation it is possible to insert via a switch (not shown) a PRBS generator (also not shown) in the transmitting path prior to serializer 18 and further to measure the channel bit error rate (BER) in the Framing block (116 in FIG. 4). Another method for measuring the channel BER is to monitor the performance bits such as parity bits or FEC code words (e.g. uncorrected or corrected channel errors) to get an estimate of the pre-FEC and/or post-FEC error rate using the SD-FEC receiver block 116 (FIG. 4). This has the advantage of not necessarily requiring a separate PRBS generator. Once the channel BER is measurable the various sections of the SD-FEC, Chromatic Dispersion Compensation, and PMD compensation, as well as other configurable sections (e.g. ADC sampling rate or precision) can be sequentially turned off (starting from full-on) or otherwise altered until there is a noticeable but acceptable decrease in performance. It is also possible to inject a pilot tone at the transmitter to continuously monitor the heath and BER of the link. It is also possible to use the SD-FEC or other FEC ability to estimate channel error rates and other error rate statistics for use in manual or automated power optimization of the transceiver.

Note that both the switch and PRBS generator can be designed into the ASIC. The ASIC has the PRBS capability included (generation on the transmit side, with checking on the receive side), and therefore software can automatically (with no human intervention) enable the PRBS, and start with no corrections enabled (or full corrections enabled) and turn on (turn-off) corrections until the BER is acceptable. Thus the lowest possible power for the configuration necessary at power up can be achieved automatically at turn-up. This process could be a binary one that occurs at the system installation and turn-up or it could be a process whereby the ASIC and system software continuously use some of the transmission capacity of the link to actively and continuously monitor the channel characteristics.

As mentioned above in cases where the demodulator supports variable precision and interpolation, the system can also adjust the ADC sampling rate at turn-up in a series of similar software driven loops in order to find the lowest acceptable sampling rate to achieve the desired BER on a given fiber/scenario combination. Full Nyquist sampling rates may not be necessary to achieve the desired BER on a given fiber/scenario combination.

Another method is that the SD-FEC decoder itself has continuous measurements of the channel error rate and the uncorrected error rate. Using this measurement technique again the various power dissipation sections can be turned off in an open loop or closed loop fashion.

Finally the ASIC itself has algorithms that naturally converge to correct for chromatic dispersion and PMD. In fact the ASIC outputs to a transceiver module microcontroller its estimate of the current parameters. A simple algorithm can be used to shut off all modules in excess of the estimated current parameters plus some buffer for margin) that were measured during turn-up or over the past selectable unit of time.

While the present invention has been described in terms of certain exemplary preferred embodiments, it will be readily understood and appreciated by one of ordinary skill in the art that it is not so limited, and that many additions, deletions and modifications to the preferred embodiments may be made within the scope of the invention as hereinafter claimed.

Accordingly, the scope of the invention is limited only by the scope of the appended claims.

What is claimed is:

1. An optical transceiver system that uses digital signal processing to process a data stream sent through a fiber optical channel to modify an optical receiver of the optical transceiver system capabilities both to achieve the a predetermined end-to-end bit error rate while to altering power dissipation in the optical receiver to that sufficient to meet said end-to-end bit error rate, the optical transceiver system comprising: an optical transmitter; and the optical receiver, the optical receiver comprising digital logic; and a controller in electrical communication with the optical receiver, wherein the controller controls either, the bypassing of portions of the digital logic, or at least reduction of one of the value of power to, parameters of or clock to portions of the digital logic, so as to reduce power dissipation in the optical receiver while meeting the end-to-end bit error rate, wherein a portion of the digital logic is an adaptive equalizer module and the adaptive equalizer module can simultaneously perform both polarization mode dispersion equalization and chromatic dispersion compensation and wherein the chromatic dispersion compensation function is reduced so as to save power when the chromatic dispersion compensation is small enough such that it can be compensated by the PMD block alone.

2. The system of claim 1 wherein the adaptive equalizer module includes sub-modules, wherein the sub-modules are repeatedly monitored for their level of use, and wherein the state of the sub-modules are dynamically changed so as to minimize power consumption.

3. An optical transceiver system that uses digital signal processing to process a data stream sent through a fiber optical channel to modify an optical receiver of the optical transceiver system capabilities both to achieve the a predetermined end-to-end bit error rate while to altering power dissipation in the optical receiver to that sufficient to meet said end-to-end bit error rate, the optical transceiver system comprising: an optical transmitter; and the optical receiver, the optical receiver comprising digital logic; and a controller in electrical communication with the optical receiver, wherein the controller controls either, the bypassing of portions of the digital logic, or at least reduction of one of the value of power to, parameters of or clock to portions of the digital logic, so as to reduce power dissipation in the optical receiver while meeting the end-to-end bit error rate, wherein the digital logic further includes an analog to digital converter and the power utilization is reduced by reducing at least one of the sampling rate and the sampling precision of the analog to digital converter.

4. An optical transceiver system that uses digital signal processing to process a data stream sent through a fiber optical channel to modify an optical receiver of the optical transceiver system capabilities both to achieve the a predetermined end-to-end bit error rate while to altering power dissipation in the optical receiver to that sufficient to meet said end-to-end bit error rate, the optical transceiver system comprising: an optical transmitter; and the optical receiver, the optical receiver comprising digital logic; and a controller in electrical communication with the optical receiver, wherein the controller controls either, the bypassing of portions of the digital logic, or at least reduction of one of the value of power to, parameters of or clock to portions of the digital logic, so as to reduce power dissipation in the optical receiver while meeting the end-to-end bit error rate, wherein the controller controls in response a measurement of at least one channel parameter, wherein the measured parameter is bulk dispersion and wherein if a compensation of the bulk dispersion is required that is at a predetermined level so as to be compensated by the polarization mode dispersion equalization, the bulk dispersion compensation module is bypassed.

* * * * *